United States Patent
Shiraishi

(10) Patent No.: US 9,981,219 B2
(45) Date of Patent: May 29, 2018

(54) GAS PURIFICATION PROCESSING APPARATUS

(71) Applicant: SE INDUSTRIES CO., LTD., Osaka (JP)

(72) Inventor: Masanori Shiraishi, Osaka (JP)

(73) Assignee: SE INDUSTRIES CO., LTD., Osaka (JP)

(*) Notice: Subject to any disclaimer, the term of this patent is extended or adjusted under 35 U.S.C. 154(b) by 43 days.

(21) Appl. No.: 15/265,619

(22) Filed: Sep. 14, 2016

(65) Prior Publication Data
US 2017/0354916 A1     Dec. 14, 2017

(30) Foreign Application Priority Data

Jun. 10, 2016  (JP) ................................. 2016-116149

(51) Int. Cl.
*B01D 53/04*     (2006.01)

(52) U.S. Cl.
CPC ..... *B01D 53/0438* (2013.01); *B01D 53/0431* (2013.01); *B01D 53/0446* (2013.01); *B01D 53/0454* (2013.01); *B01D 2253/102* (2013.01); *B01D 2257/404* (2013.01); *B01D 2257/702* (2013.01); *B01D 2257/708* (2013.01);
(Continued)

(58) Field of Classification Search
CPC ............ B01D 53/0431; B01D 53/0438; B01D 53/0446; B01D 53/0454; B01D 2253/102; B01D 2258/0258; B01D 2258/06; B01D 2257/404; B01D 2257/702; B01D 2257/7027; B01D 2257/708;
(Continued)

(56) References Cited

U.S. PATENT DOCUMENTS 1,590,266 A * 6/1926 Tiedtke .................. B01D 53/06
                                                            96/145
4,816,043 A * 3/1989 Harrison ............ B01D 53/0454
                                                            96/112
(Continued)

FOREIGN PATENT DOCUMENTS

| JP | 06106030 A | 4/1994 |
|----|------------|--------|
| JP | 2016000189 A | 1/2016 |
| WO | 8801534 A1 | 3/1988 |
| WO | 9944734 A1 | 9/1999 |

OTHER PUBLICATIONS

Extended European Search Report received in European patent application No. 16188565.2, dated Feb. 28, 2017, 9 pages.

*Primary Examiner* — Frank Lawrence
(74) *Attorney, Agent, or Firm* — Procopio Cory Hargreaves and Savitch LLP; Pattric J. Rawlins

(57) ABSTRACT

A gas purification processing apparatus is described. The gas purification processing apparatus can control the generation of adsorption heat by an adsorbate substance in purification processing and thereby prevent desorption or ignition or the like of the adsorbate component by performing cooling processing on an adsorbent itself when needed. This advantageously ensures high adsorption efficiency with a simple and convenient configuration. During operation of the apparatus, gas is supplied from the source and purified by a purification part and then discharged as a purified gas. When the temperature of the purification part exceeds a predetermined temperature, a cooling medium is supplied from the cooling processing part to cool the purification part.

8 Claims, 3 Drawing Sheets

(52) U.S. Cl.
CPC .. *B01D 2257/7027* (2013.01); *B01D 2257/90* (2013.01); *B01D 2257/91* (2013.01); *B01D 2258/0258* (2013.01); *B01D 2258/06* (2013.01); *B01D 2259/4009* (2013.01); *B01D 2259/4533* (2013.01)

(58) Field of Classification Search
CPC ............ B01D 2257/90; B01D 2257/91; B01D 2259/4009; B01D 2259/4533
USPC .......................................... 96/108, 112, 146
See application file for complete search history.

(56) References Cited

U.S. PATENT DOCUMENTS

| | | | | |
|---|---|---|---|---|
| 5,169,414 | A * | 12/1992 | Panzica .............. | B01D 53/0431 95/113 |
| 6,066,192 | A * | 5/2000 | Toshinaga .......... | B01D 53/0431 95/101 |
| 6,086,659 | A * | 7/2000 | Tentarelli ........... | B01D 53/0431 422/179 |
| 2005/0051029 | A1* | 3/2005 | Lloyd ................ | B01D 53/0431 96/109 |
| 2005/0150377 | A1* | 7/2005 | Friday ................... | B01D 53/04 95/96 |
| 2008/0028933 | A1 | 2/2008 | Ross et al. | |
| 2010/0058804 | A1* | 3/2010 | Monereau .......... | B01D 53/0431 62/642 |

\* cited by examiner

GAS PURIFICATION PROCESSING APPARATUS

BACKGROUND OF THE INVENTION

Field of the Invention

The present invention relates to a gas purification processing apparatus, and more particularly to a gas purification processing apparatus that performs purification processing (comprising deodorization processing and the like) of a exhaust gas coming from production equipment, sterilization processing of air in medical facilities, and the like by using an adsorbent such as activated carbon and the like.

Description of the Related Art

A gas purification processing apparatus is widely used not only in industrial fields such as various chemical plants, coating processes, and drug factories and the like but also in general homes and medical facilities and the like. At this time, a target of purification processing comprises not only harmful substances such as nitrogen oxides ($NO_x$), formaldehyde (HCHO), toluene ($C_7H_8$) and the like but also odorous substances such as a slight amount of mercaptan and the like as well as pathogenic microorganisms such as tubercule bacilli and infectious droplets containing these (which may be hereafter referred to as "bacteria and the like") that are floating in air in medical facilities and the like. These harmful substances, odorous substances, bacteria and the like give a large influence not only on facilities but also on peripheral environments thereof, and may possibly cause environmental pollution, bad-odor problems, group infection in medical facilities, and the like. Therefore, a stably high gas purification processing function is demanded in a gas purification processing apparatus.

For example, in highly purified air production, there are proposed an air purification method in which a method of contact by a catalyst and a method of purification by adsorption are combined (for example, see Patent Document JP-A-06-106030) and an air purification apparatus as shown in FIG. 3 (for example, see Patent Document JP-A-2016-189). Referring to FIG. 3, the air purification apparatus is characterized by having an odor purification section 117 provided with an air-permeable processing plate material containing an adsorbent material that adsorbs an odor component and comprising a photocatalyst layer that is activated by solar light coming from a solar light intake window 113 to decompose the odor component adsorbed onto the adsorbent material, and a entrance-side gas processing section 119 that is disposed on an upstream side of the odor purification section 117 to be in communication with an air intake inlet 111 and is provided with a buffering adsorbent material 118 that temporarily adsorbs the odor component contained in air to level the content fluctuation of the odor component flowing into the odor purification section 117. In FIG. 3, the reference numeral 112 denotes an air discharging outlet; the reference numeral 120 denotes a post-processing adsorbent material; and the reference numeral 121 denotes an exit-side gas processing section.

However, the air purification processing apparatus may raise problems mentioned below.

(i) The air purification processing apparatus has a configuration in which adsorption processing and chemical processing using an oxidation catalyst or a photocatalyst are combined as high purification processing of air. Therefore, it is not possible to prevent the apparatus from becoming cumbersome and complex. In particular, for adsorption processing under the optimum conditions, it is necessary to maintain a predetermined temperature to source material air to be introduced and, when there is heating or the like by chemical reaction, cooling processing or the like at a stage prior to introduction of air may be required.

(ii) When a large amount of an adsorbate component is contained in the source material air, there are a possibility of generation of large adsorption heat, a possibility of generation of reaction heat caused by reaction of the adsorbate component adsorbed onto the adsorbent material, and a possibility of generation of a combustible gas caused by reaction. Therefore, it is necessary to control the temperature of the adsorbent material and the temperature of air after the adsorption processing. A rise in the surface temperature of the adsorbent material invites a possibility of desorption of the adsorbate component concentrated on the surface of the adsorbent material, thereby causing a possibility of affecting processing after the adsorption processing. Also, when a combustible gas is generated in the adsorbate component or by reaction, there is a fear of ignition if there is an ignition source in an air flow passage. In the prior art, there has not been an apparatus that are fully considered in view of such possibilities. In particular, when air continuous purification processing is carried out, it has been difficult to take measures for preventing the influence thereof. This has been an important problem of the air purification apparatus using adsorption processing.

(iii) The adsorbate component in air that is subjected to the purification processing may largely fluctuate. For example, the concentration of an adsorbate component in air that contains a solvent component generated in a coating processing step is extremely high during the coating processing and decreases before and after the coating processing. Also, in medical facilities and the like as well, there are emergency cases in which a large amount of bacteria are brought in, whereas the number of bacteria at ordinary time is extremely small. In the apparatus exemplified in FIG. 3 in which a leveling buffering adsorbent material is provided in advance and in the air purification apparatus provided in medical facilities and the like, the volume of the buffering adsorbent material or the adsorbent agent for processing that is to be disposed is determined by assuming a case where the concentration of the adsorbate component is high, so that a large volume of the adsorbent material is required to be provided in accordance therewith. On the other hand, at ordinary time at which the concentration of the adsorbate component is low, such a large volume of the adsorbent material invites decrease in the processing speed of the purification processing as a whole. In one purification processing apparatus, a function that can meet the concentration change of the adsorbate component and also can perform quick purification processing is demanded.

Therefore, an object of the present invention is to provide an air purification processing apparatus that can control the generation of adsorption heat by an adsorbate substance in purification processing, that can prevent desorption or ignition or the like of the adsorbate component by performing cooling processing on an adsorbent itself when needed, and that can ensure a high adsorption efficiency with a simple and convenient configuration. Also, another object of the present invention is to provide an air purification processing apparatus having a function of being capable of quick purification processing that meets the concentration change of the adsorbate component.

SUMMARY OF THE INVENTION

As a result of repetition of eager researches, the present inventors have found that the aforementioned object can be achieved by a gas purification processing apparatus shown below, and have completed the present invention.

A gas purification processing apparatus according to the present invention comprises:

a main body having an inner tube in which a gas passage part having a mesh shape or a net shape is formed and an outer tube which is disposed on an outer circumference of the inner tube and in which a gas passage part having a mesh shape or a net shape is formed;

a source material supplying part for supplying a source material gas to be processed;

a dispersion part for dispersing the supplied source material gas;

a purification part for conducting purification processing of the dispersed source material gas;

a discharging part for discharging a gas that has passed through the purification part;

a thermometer for measuring a temperature of the purification part; and a cooling processing part disposed in an upper part of the purification part and for conducting cooling processing of the purification part, wherein the dispersion part is formed of the inner tube and an inside space of the inner tube, and the discharging part is formed of the outer tube, an outside space of the outer tube, and a discharging flow passage; or alternatively, the dispersion part is formed of the outer tube and an outer circumferential space of the outer tube, and the discharging part is formed of the inner tube, an inside space of the inner tube, and a discharging flow passage;

the purification part is formed in a space part between the inner tube and the outer tube, and the space part is filled with a gas-permeable adsorbent that is capable of desorption by heating;

the source material gas supplied from the source material supplying part and dispersed in the dispersion part passes through the purification part to be subjected to the purification processing and thereafter is discharged as a purified gas via the discharging part; and when the temperature of the purification part exceeds a predetermined temperature, a cooling medium is supplied out from the cooling processing part so as to perform the cooling processing of the purification part.

Such a configuration allows a gas purification processing apparatus that can control the generation of adsorption heat or reaction heat or the like caused by an adsorbate substance in the purification processing, that can prevent desorption or ignition or the like of the adsorbate component by performing the cooling processing on the adsorbent itself when needed, and that can ensure a high adsorption efficiency. In particular, when the cooling medium is supplied out from the cooling processing part disposed in the upper part of the purification part so as to perform the cooling processing of the purification part, the cooling medium supplied spreads over from the upper part to the lower part onto the adsorbent filled in the space part between the inner tube and the outer tube, and the cooling medium that has been heated from the upper part having a comparatively high temperature heats the lower part having a comparatively low temperature, thereby producing an effect that the temperature distribution in the inside of the purification part can be made uniform.

In the gas purification processing apparatus of the present invention, activated carbon is used as the adsorbent; the cooling processing part is disposed to surround an outer circumferential surface of the inner tube or an inner circumferential surface of the outer tube; and the cooling medium is supplied out uniformly from the upper part of the purification part to the adsorbent, so as to perform the cooling processing of the purification part.

Such a configuration allows that the cooling medium can be supplied out uniformly to the adsorbent also in the cross-sectional direction of the purification part, and the cooling medium supplied spreads over from the upper part to the lower part onto the adsorbent, so that the temperature distribution in the inside of the purification part can be made further uniform.

In the gas purification processing apparatus of the present invention, the inner tube and the outer tube are divided into a plurality of tube bodies by one or a plurality of wall parts having a central axis of the main body in common; and each of the tube bodies has the source material supplying part, the dispersion part, the purification part, the discharging part, the thermometer, and the cooling processing part.

As described above, according to the prior art, it has been difficult to perform purification processing that quickly meets with a large fluctuation of the adsorbate component in air that is subjected to the purification processing. The present invention makes it possible to perform purification processing that quickly meets with a large fluctuation by providing the plurality of tube bodies divided by the wall parts having the central axis of the main body in common with a purification function respectively inherent thereto and introducing the source material gas by switching to a tube body having a purification function that accords to the fluctuation. In particular, when the tube bodies divided by the wall parts having the central axis of the main body in common each have a purification part that differs in volume, the gas purification processing apparatus has the dispersion function, the purification function, and the cooling function for the respective source material gas that accord to the volume, thereby ensuring the purification function that more quickly meets with the fluctuation in the source material gas.

In the gas purification processing apparatus of the present invention, after the purification processing in the gas purification processing apparatus is finished and before the gas purification processing apparatus is stopped, the cooling medium is supplied out from the cooling processing part to perform the cooling processing of the purification part.

As described above, in the gas purification processing apparatus, there is a need to suppress the generation of adsorption heat or reaction heat of the adsorbate component that has been adsorbed onto the adsorbent and the generation of a combustible gas. Therefore, in order to perform the purification processing stably, the cooling processing in the purification part is essential. Meanwhile, such generation of the adsorption heat and the like may possibly occur not only during the time of operation of the gas purification processing apparatus but also in the stopped state in which the source material gas does not pass through the purification part. The present invention makes it possible to suppress the generation of the adsorption heat and the like in the stopped state and to suppress sudden and rapid generation of the adsorption heat and the like at the time of starting the gas purification processing apparatus by performing the cooling processing of the purification part after the finish of the purification processing and before the stop of the gas purification processing apparatus in addition to performing the cooling processing based on the temperature control of the purification part. Accordingly, a safer gas purification processing apparatus can be configured. Also, when the cooling medium is supplied out from the upper part of the purification part so as to perform the cooling processing of the purification part, the cooling medium supplied spreads over from the upper part to the lower part onto the adsorbent, and the cooling medium that has been heated from the upper part having a comparatively high temperature heats the lower part having a comparatively low temperature, whereby the temperature distribution in the inside of the purification part can be made uniform.

DETAILED DESCRIPTION OF THE PREFERRED EMBODIMENTS

An air purification processing apparatus according to the present invention (hereafter referred to as "present apparatus") comprises a main body having an inner tube and an outer tube which is disposed on an outer circumference of the inner tube; a source material supplying part for supplying a source material gas to be processed; a dispersion part for dispersing the supplied source material gas; a purification part for conducting purification processing of the dispersed source material gas; a discharging part for discharging a gas that has passed through the purification part; a thermometer for measuring a temperature of the purification part; and a cooling processing part disposed in an upper part of the purification part and for conducting cooling processing of the purification part. In each of the inner tube and the outer tube, a gas passage part having a mesh shape or a net shape is formed. Also, the dispersion part is formed of the inner tube and an inside space of the inner tube, and the discharging part is formed of the outer tube, an outside space of the outer tube, and a discharging flow passage, or alternatively, the dispersion part is formed of the outer tube and an outer circumferential space of the outer tube, and the discharging part is formed of the inner tube, an inside space of the inner tube, and a discharging flow passage. The purification part is formed in a space part between the inner tube and the outer tube, and the space part is filled with a gas-permeable adsorbent that is capable of desorption by heating. The source material gas supplied from the source material supplying part and dispersed in the dispersion part passes through the purification part to be subjected to the purification processing and thereafter is discharged as a purified gas via the discharging part. When the temperature of the purification part exceeds a predetermined temperature, a cooling medium is supplied out from the cooling processing part so as to perform the cooling processing of the purification part. Thus, the present apparatus can control the generation of adsorption heat or reaction heat or the like caused by an adsorbate substance in the purification processing, can prevent desorption or ignition or the like of the adsorbate component by performing the cooling processing on the adsorbent itself when needed, and can ensure a high adsorption efficiency. Hereafter, the embodiments of the present invention will be described with reference to the attached drawings.

<Configuration Example of Present Apparatus>

Figure 1A:
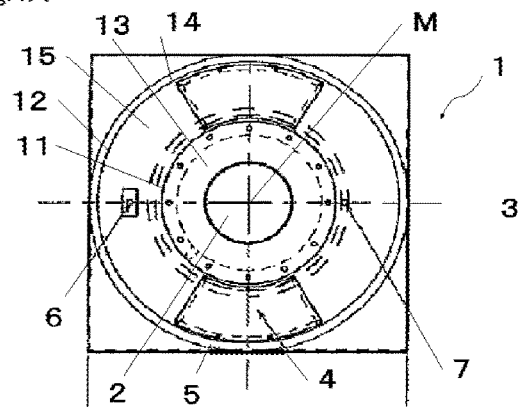
FIGS. 1A, 1B, and 1C show an overall configuration view exemplifying a basic configuration of a gas purification processing apparatus according to the present invention.
Figure 1C:
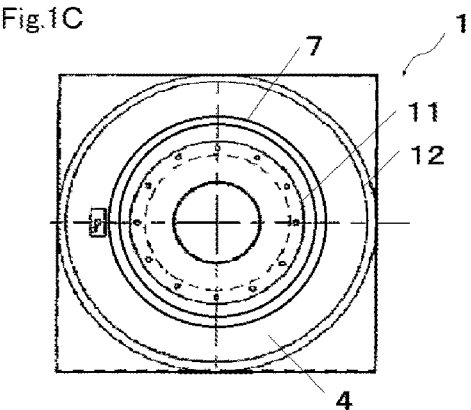
Figure 1B:
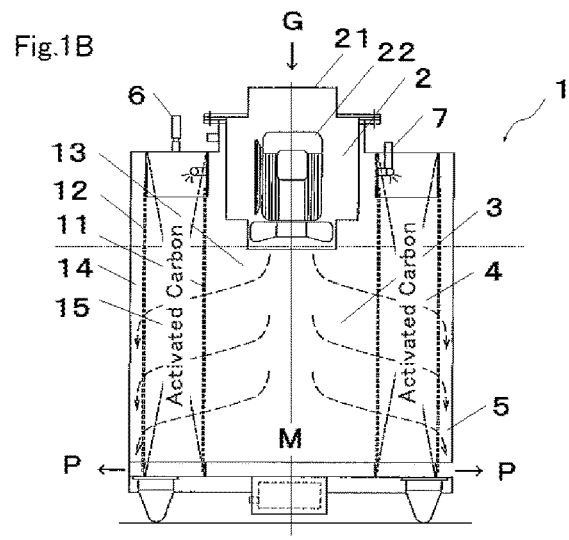

As an embodiment of the present apparatus, an overall basic schematic configuration is exemplified in FIGS. 1A and 1B (first configuration example). The present apparatus comprises a main body 1, a source material supplying part 2, a dispersion part 3, a purification part 4, a discharging part 5, a thermometer 6, and a cooling processing part 7. The main body 1 has an inner tube 11 and an outer tube 12 which is disposed on an outer circumference of the inner tube 11. The first configuration example has a configuration in which a source material gas G is supplied from an inside space 13 of the inner tube 11 to the purification part 4 and is discharged via an outer circumferential space 14 of the outer tube 12. Conversely, it is possible to adopt a configuration in which a source material gas G is supplied from an outer circumferential space 14 of the outer tube 12 to the purification part 4 and is discharged via an inside space 13 of the inner tube 11. Also, although the case is exemplified as the present apparatus where the main body 1, the inner tube 11, and the outer tube 12 are made to be cylindrical tubes, the present invention is not limited to this case, as will be shown in other configuration examples described later. The following description will be given based on the first configuration example.

The source material gas G is supplied from the source material supplying part 2. The source material supplying part 2 comprises an introduction inlet 21 for introducing the source material gas G and a supplying fan 22 for supplying the source material gas G. However, when a section for supplying the source material gas G is provided outside of the main body, there is no need to provide the supplying fan 22. The source material gas G supplied is dispersed in the dispersion part 3. The dispersion part 3 comprises the inside space 13 of the inner tube 11 and the inner tube 11 in which a gas passage part (not illustrated) having a mesh shape or a net shape is formed. The source material gas G is diffused in a pressurized state in the inside space 13 and is dispersed into flows having a substantially equal pressure and a substantially equal flow rate by passing through a mesh-shaped or net-shaped throttle of the gas passage part, so as to be supplied to the purification part 4. When the source material gas G is supplied out downwards from the vicinity of a central axis M of the main body 1 in the inside space 13 during this process, flows having a further equal pressure and a further equal flow rate can be formed, whereby the uniformly dispersed source material gas G can be supplied to the purification part 4.

The source material gas G dispersed in the dispersion part 3 is supplied to the purification part 4 so as to be subjected to the purification processing. The purification part 4 is formed of a space part 15 disposed between the inner tube 11 and the outer tube 12, and the space part 15 is filled with an adsorbent (activated carbon). The source material gas G dispersed and introduced from the inner tube 11 is discharged in a pressurized state via the outer tube 12 having a larger surface area than the inner tube 11. Therefore, the source material gas G is radially diffused from the gas passage part and passes through the inside of the purification part 4 to be in contact with the adsorbent for a long time of contact, thereby efficiently subjected to the purification processing. The adsorbent is preferably a gas-permeable reagent being capable of desorption by heating and having a high adsorption capability. Specifically, the adsorbent is preferably porous activated carbon such as coconut shell type carbon, coal type carbon, or charcoal type carbon, or the like, and is preferably activated carbon which is fabricated by being treated with water vapor or a chemical agent or the like to have a high adsorption capability. The adsorption capability is selected in accordance with the kind and concentration of the adsorbate substance, and various kinds of activated carbon having different processing contents are selected.

The gas subjected to the purification processing in the purification part 4 is discharged as a purified gas P via the discharging part 5. The discharging part 5 comprises the outer tube 12 in which a gas passage part (not illustrated) having a mesh shape or a net shape is formed and the outer circumferential space 14. The purified gas P is discharged in a uniformly purified state by being diffused to the outside space 14 via the mesh-shaped or net-shaped throttle of the gas passage part.

The thermometer 6 is disposed in an upper part of the purification part 4 for measuring the temperature of the purification part 4. When the thermometer 6 is disposed in the upper part of the purification part 4 having the highest inside temperature, the adsorption heat, the reaction heat, and the like generated by the adsorbate substance in the purification processing can be accurately controlled.

The cooling processing part 7 for conducting cooling processing of the purification part 4 is disposed in the upper part of the purification part 4. The cooling processing part 7 preferably has a configuration in which a cooling medium can pass through the inside and which is provided with an opening capable of supplying the cooling medium out at a predetermined interval. When the temperature of the purification part 4 exceeds a predetermined temperature, the cooling medium is supplied out from the opening, so as to conduct the cooling processing of the purification part 4 as a whole. When the cooling medium is supplied out from the cooling processing part 7 disposed in the upper part of the purification part 4 so as to conduct the cooling processing of the purification part 4, the cooling medium supplied spreads over from the upper part to the lower part onto the adsorbent introduced into the space part 15 between the inner tube 11 and the outer tube 12, and the cooling medium that has been heated from the upper part having a comparatively high temperature heats the lower part having a comparatively low temperature, thereby producing an effect that the temperature distribution in the inside of the purification part 4 can be made uniform. The uniformization of the temperature distribution in the inside of the purification part 4 can achieve homogenization of the adsorption capability of the introduced adsorbent, whereby purification processing with high efficiency can be carried out.

Also, the cooling processing part 7 is preferably disposed to surround an outer circumferential surface of the inner tube 11 or an inner circumferential surface of the outer tube 12, as exemplified in FIG. 1C. This allows that the cooling medium can be supplied out uniformly from the upper part of the purification part 4 onto the adsorbent, and the cooling processing of the purification part 4 can be carried out uniformly. Specifically, the cooling medium can be supplied out uniformly also in the cross-sectional direction of the purification part 4 onto the adsorbent, and the cooling medium supplied spreads over from the upper part to the lower part onto the adsorbent, whereby the temperature distribution in the inside of the purification part 4 can be made further more uniform. Also, when the cooling processing part 7 is disposed to surround the outer circumferential surface of the inner tube 11 or the inner circumferential surface of the outer tube 12, the inner tube 11 or the outer tube 12 can be subjected to the cooling processing more efficiently. Further, when the source material gas G supplied passes through the purification part 4 via the cooled inner tube 11 or outer tube 12, the purification processing can be performed while ensuring high adsorption capability.

After the purification processing in the present apparatus is finished, it is preferable to heat the purification part 4 to perform purging processing. By performing desorption processing on the adsorbent (allowing the adsorbate substance adsorbed onto the adsorbent surface to be desorbed), the adsorption function of the purification part 4 can be maintained. In the cooling processing by the cooling processing part 7, it is preferable that the cooling medium is supplied out to the purification part 4 after the purification processing in the present apparatus is finished and before the present apparatus is stopped. The generation of adsorption heat or the like accompanying the purification processing may possibly occur not only during the operation of the present apparatus but also in a stopped state in which the source material gas does not pass through the purification part 4 after the purification processing is finished. Therefore, by performing the cooling processing through supplying the cooling medium to the purification part 4 after the purification processing is finished and before the gas purification processing apparatus is stopped in addition to the cooling processing based on the temperature control of the purification part 4, the generation of the adsorption heat or the like in the stopped state can be suppressed. When the cooling medium is supplied out from the upper part of the purification part 4 to perform the cooling processing of the purification part 4, the cooling medium supplied spreads over from the upper part to the lower part onto the adsorbent, and the cooling medium that has been heated from the upper part having a comparatively high temperature heats the lower part having a comparatively low temperature, thereby producing an effect that the temperature distribution in the inside of the purification part 4 can be made uniform. Further, when the supply of the source material gas G is started at the time of starting the present apparatus, sudden generation of the adsorption heat or the like can be suppressed. In particular, when the source material gas G supplied passes through the purification part 4 via the cooled inner tube 11 or outer tube 12, the purification processing can be performed while ensuring high adsorption capability. Accordingly, a safer gas purification processing apparatus can be configured.

[Other Configuration Examples of Present Apparatus]

A second configuration example of the present apparatus is shown in FIGS. 2A, 2B, 2C, and 2D. A basic configuration is the same as that in the first configuration example; however, the inner tube 11 and the outer tube 12 are divided into a plurality of tube bodies 10 (10a to 10d) by one or a plurality of wall parts 8 (8a to 8c) having a central axis M of the main body 1 in common, and each of the tube bodies 10 (10a to 10d) has the source material supplying part 2 (2a to 2d), the dispersion part 3 (3a to 3d), the purification part 4 (4a to 4d), the discharging part 5 (5a to 5d), the thermometer 6 (6a to 6d), and the cooling processing part 7 (7a to 7d). Purification processing that accords to fluctuation speedily can be performed by allowing the plurality of tube bodies 10 (10a to 10d) to have a purification function respectively inherent thereto and introducing the source material gas G by switching to a tube body 10 (10a to 10d) having a purification function that accords to the fluctuation. The number and arrangement of the wall parts 8 for division can be selected in accordance with the kind and concentration of the adsorbate substance, whereby various kinds of purification processing having different processing contents or a plurality of the same kinds of purification processing can be carried out.

Figure 2A:
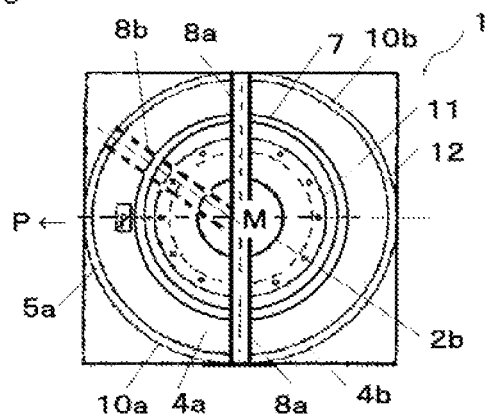
FIGS. 2A, 2B, 2C, and 2D show an overall configuration view illustrating a second configuration example of a gas purification processing apparatus according to the present invention.

Specifically, FIG. 2A exemplifies a configuration in which the inner tube 11 and the outer tube 12 are divided into two tube bodies 10a, 10b having the same volume and the same function by the wall part 8a. For example, by performing the purification processing in one tube body, performing the desorption processing in the other tube body, and, after a predetermined period of time passes, using the respective processing functions conversely, the purification processing can be continuously carried out for a long period of time (function A) in one unit (main body 1). Also, for example, by filling the purification part 4a of one tube body 10a with an adsorbent that can selectively adsorb a specific adsorbate substance, filling the purification part 4b of the other tube body 10b with an adsorbent that can selectively adsorb another adsorbate substance, and supplying the purified gas P discharged from the discharging part 5a of the tube body 10a to the source material supplying part 2b of the tube body 10b, a plurality of different kinds of substances contained in the source material gas G can be selectively separated (function B). Also, as shown by a broken line in FIG. 2A, by disposing the wall part 8b in place of the wall part 8a, two tube bodies 10a, 10b having different volumes can be formed.

Figure 2B:
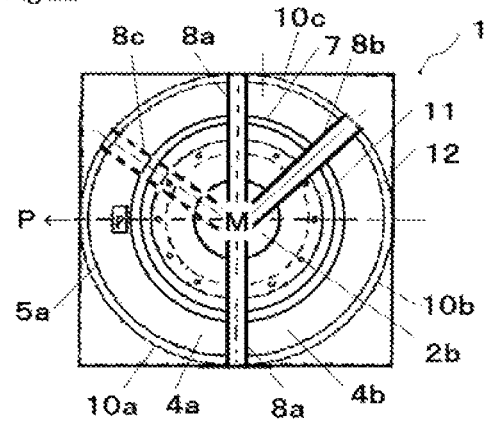

FIG. 2B exemplifies a configuration in which the inner tube 11 and the outer tube 12 are divided into three tube bodies 10a to 10c having different volumes (functions) by the wall parts 8a, 8b. By having the purification parts 4a to 4c having different volumes, the apparatus has the dispersion function, the purification function, and the cooling function for the respective source material gas that accord to the volume, thereby ensuring the purification function that meets more speedily with the fluctuation in the source material gas. However, as shown by a broken line in FIG. 2B, by providing the wall part 8c in place of the wall part 8a to dispose the wall parts 8a to 8c, three tube bodies 10a to 10c having the same volume can be formed. Similarly to FIG. 2A above, the function A and the function B can be configured. Also, by having three tube bodies 10a to 10c, the apparatus can switch among further more stages with respect to the function A and can selectively separate the different kinds of further more substances contained in the source material gas G with respect to the function B.

Figure 2C:
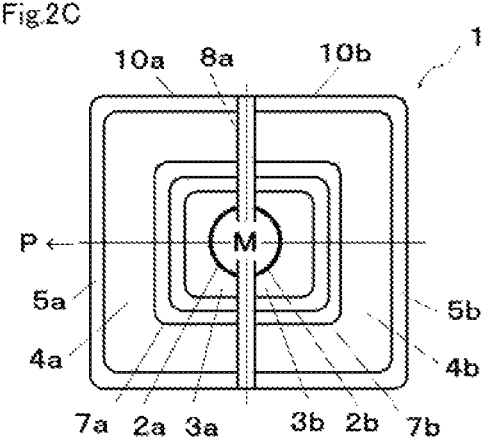

FIG. 2C shows a configuration example in which the cross-sectional shape of the tube body is different. Each of the tube bodies 10a, 10b divided by the wall part 8a and having a rectangular shape in a cross-section has the source material supplying part 2a, 2b, the dispersion part 3a, 3b, the purification part 4a, 4b, the discharging part 5a, 5b, the thermometer 6a, 6b (not illustrated), and the cooling processing part 7a, 7b, and the source material gas G supplied from the source material supplying part 2 is supplied to the purification part 4a, 4b in the central axis M direction of the dispersion part 3a, 3b, whereby the function A and the function B can be configured similarly to FIG. 2A above.

Figure 2D:
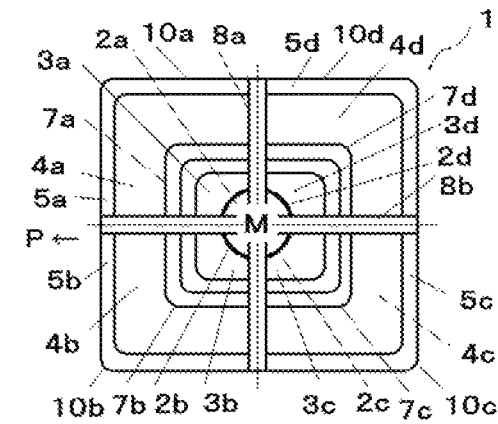
Figure 3:
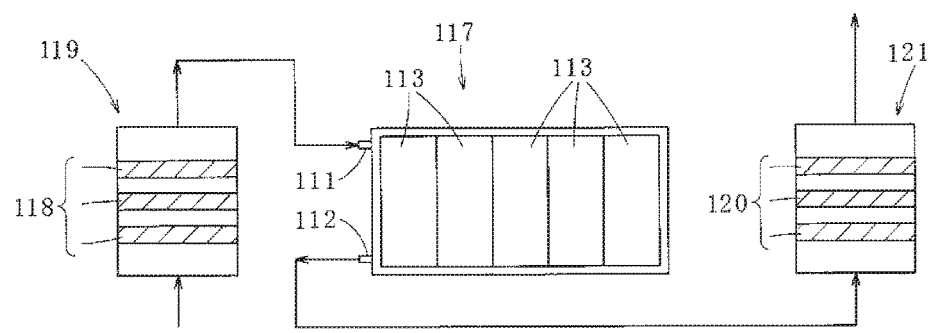
FIG. 3 shows an overall configuration view exemplifying an air cleaning apparatus according to the prior art.

FIG. 2D shows a configuration example in which a tube body having a rectangular shape in a cross-section is divided into four tube bodies 10a to 10d by the wall parts 8a, 8b. Each of the tube bodies 10a to 10d has the source material supplying part 2a to 2d, the dispersion part 3a to 3d, the purification part 4a to 4d, the discharging part 5a to 5d, the thermometer 6a to 6d (not illustrated), and the cooling processing part 7a to 7d, so that the apparatus can switch among further more stages with respect to the function A and can selectively separate the different kinds of further more substances contained in the source material gas G with respect to the function B. Although an example in which the wall parts are changed is not shown in the above-described configuration example provided with a tube body having a rectangular shape in a cross-section, the wall parts can be changed similarly to FIGS. 2A and 2B above.

The invention claimed is:

1. A gas purification processing apparatus according to the present invention comprises:
   a main body having an inner tube in which a gas passage part having a mesh shape or a net shape is formed and an outer tube which is disposed on an outer circumference of the inner tube and in which a gas passage part having a mesh shape or a net shape is formed;
   a source material supplying part for supplying a source material gas to be processed;
   a dispersion part for dispersing the supplied source material gas;
   a purification part for conducting purification processing of the dispersed source material gas;
   a discharging part for discharging a gas that has passed through the purification part;
   a thermometer for measuring a temperature of the purification part; and
   a cooling processing part disposed in an upper part of the purification part and for conducting cooling processing of the purification part,
   wherein the dispersion part is formed of the inner tube and an inside space of the inner tube, and the discharging part is formed of the outer tube, an outside space of the outer tube, and a discharging flow passage; or alternatively, the dispersion part is formed of the outer tube and an outer circumferential space of the outer tube, and the discharging part is formed of the inner tube, an inside space of the inner tube, and a discharging flow passage;
   the purification part is formed in a space part between the inner tube and the outer tube, and the space part is filled with a gas-permeable adsorbent that is capable of desorption by heating;
   the source material gas supplied from the source material supplying part and dispersed in the dispersion part passes through the purification part to be subjected to the purification processing and thereafter is discharged as a purified gas via the discharging part; and
   when the temperature of the purification part exceeds a predetermined temperature, a cooling medium is supplied out from the cooling processing part so as to perform the cooling processing of the purification part.

2. The apparatus according to claim 1, wherein
   activated carbon is used as the adsorbent;
   the cooling processing part is disposed to surround an outer circumferential surface of the inner tube or an inner circumferential surface of the outer tube; and
   the cooling medium is supplied out uniformly from the upper part of the purification part to the adsorbent, so as to perform the cooling processing of the purification part.

3. The apparatus according to claim 1, wherein
   the inner tube and the outer tube are divided into a plurality of tube bodies by one or a plurality of wall parts having a central axis of the main body in common; and
   each of the tube bodies has the source material supplying part, the dispersion part, the purification part, the discharging part, the thermometer, and the cooling processing part.

4. The apparatus according to claim 2, wherein
the inner tube and the outer tube are divided into a plurality of tube bodies by one or a plurality of wall parts having a central axis of the main body in common; and
each of the tube bodies has the source material supplying part, the dispersion part, the purification part, the discharging part, the thermometer, and the cooling processing part.

5. The apparatus according to claim 1, wherein
after the purification processing in the gas purification processing apparatus is finished and before the gas purification processing apparatus is stopped, the cooling medium is supplied out from the cooling processing part to perform the cooling processing of the purification part.

6. The apparatus according to claim 2, wherein
after the purification processing in the gas purification processing apparatus is finished and before the gas purification processing apparatus is stopped, the cooling medium is supplied out from the cooling processing part to perform the cooling processing of the purification part.

7. The apparatus according to claim 3, wherein
after the purification processing in the gas purification processing apparatus is finished and before the gas purification processing apparatus is stopped, the cooling medium is supplied out from the cooling processing part to perform the cooling processing of the purification part.

8. The apparatus according to claim 4, wherein
after the purification processing in the gas purification processing apparatus is finished and before the gas purification processing apparatus is stopped, the cooling medium is supplied out from the cooling processing part to perform the cooling processing of the purification part.

* * * * *